United States Patent [19]

Mitchell

[11] 4,258,589
[45] Mar. 31, 1981

[54] PLANETARY ADJUSTER

[75] Inventor: Wallace F. Mitchell, Mettawa, Ill.

[73] Assignee: Liquid Controls Corporation, North Chicago, Ill.

[21] Appl. No.: 944,407

[22] Filed: Sep. 21, 1978

[51] Int. Cl.³ .............................................. F16H 15/50
[52] U.S. Cl. ......................................... 74/796; 74/198
[58] Field of Search ................................. 74/796, 198

[56] References Cited

U.S. PATENT DOCUMENTS

| 1,976,407 | 10/1934 | Morgan | 74/796 |
| 2,868,038 | 1/1959 | Billeter | 74/796 |

FOREIGN PATENT DOCUMENTS 866748  2/1953  Fed. Rep. of Germany ............ 74/198

Primary Examiner—Kenneth Downey
Attorney, Agent, or Firm—Edmond T. Patnaude

[57] ABSTRACT

A planetary friction drive includes a plurality of balls which are driven about a frusto-conical outer race by an inner driving surface made up of a pair of jaws which are spring biased toward one another into frictional engagement with the balls, and the drive ratio is adjusted by axially moving the inner driving surface relative to the outer race.

8 Claims, 8 Drawing Figures

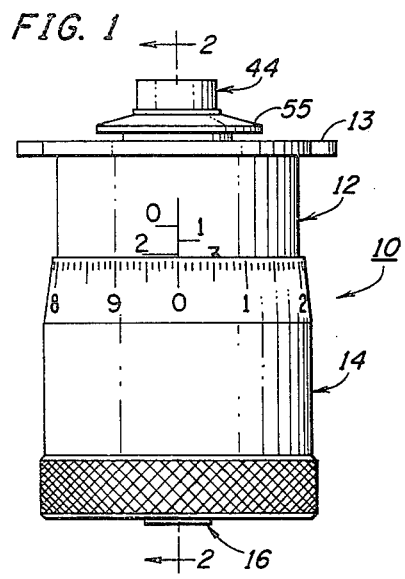
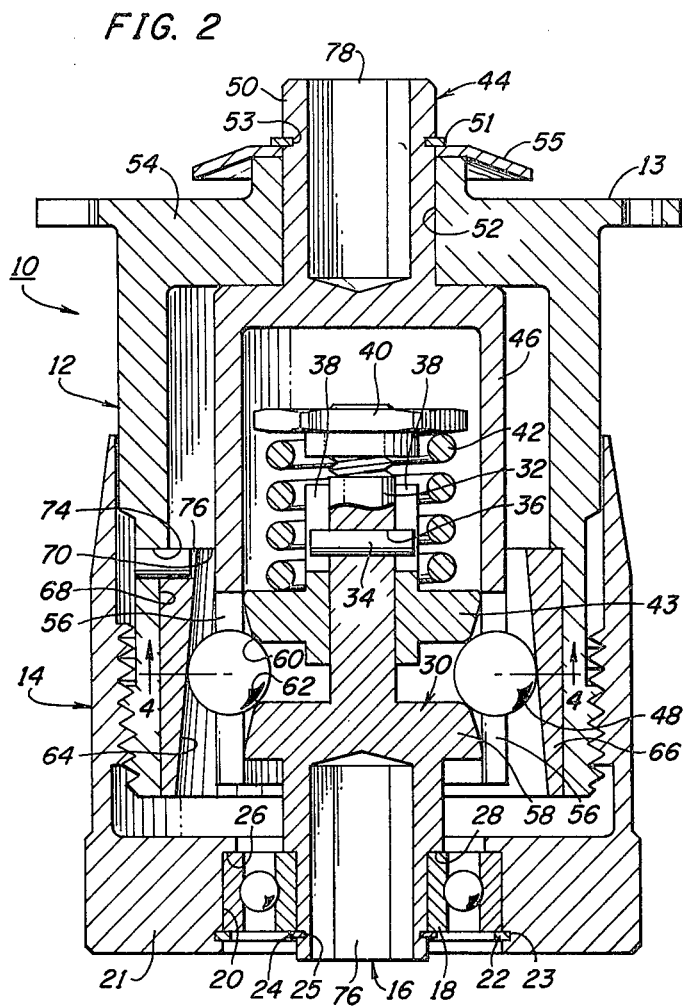
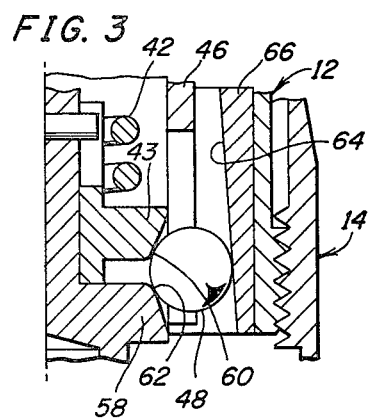
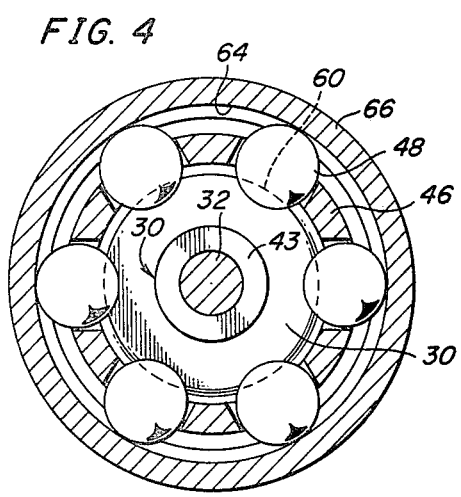
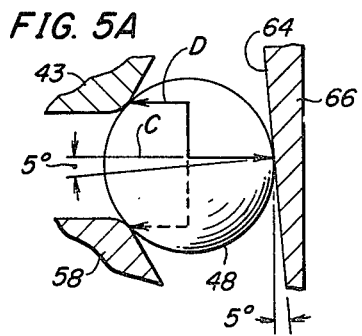
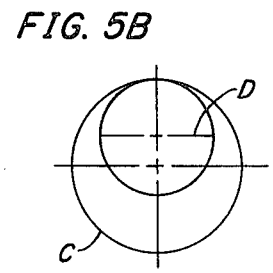
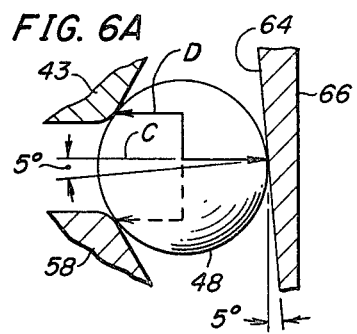
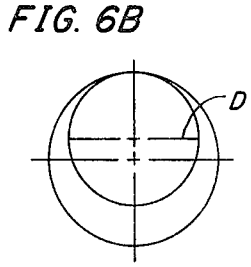

PLANETARY ADJUSTER

The present invention relates in general to a transmission mechanism capable of providing an infinitely variable drive ratio between a flow meter and other instruments driven by the meter, and it relates in particular to a new and improved planetary friction drive adjuster providing a high torque coupling between the driving and driven parts.

BACKGROUND OF THE INVENTION

While the present invention will find application wherever it is desired to adjust the drive ratio between a drive shaft and a driven shaft, it is particularly suited for use in liquid flow metering systems. Such systems commonly employ a positive displacement meter having one or more rotors which rotate through a predetermined angle as a corresponding quantity of liquid flows through the meter. The output shaft of the meter is coupled by a transmission having an adjustable drive ratio to various instruments including a counter which provides a visible indication of the quantity of liquid passed through the meter. In the metering art, such a variable transmission device is commonly referred to as an adjuster. The quantity of liquid actually passed through the meter and the quantity indicated by the counter may differ for many reasons, and the purpose of the adjuster is to make adjustments to compensate for these differences.

An adjuster in the form of an infinitely variable planetary drive mechanism incorporating a plurality of balls which couple an input shaft to an output shaft is disclosed in U.S. Pat. No. 2,868,038. This prior art adjuster has been successfully used in the liquid metering field for many years because of its many desirable features, not the least of which is a linear response curve. However, the required torque capacity of adjusters has increased over the years as the loads on the meter have increased. In addition to the counter, there are now several other devices such as presets, printers and temperature compensators which are commonly stacked on the counter and which must also be driven by the meter. Also, unscrupulous persons have been known to temporarily overload the adjusters so that excessive slippage occurs with consequently false readings appearing on the associated counters and printers. The torque capacity of this prior art adjuster cannot be appreciably increased without greatly increasing its overall size inasmuch as an increase in the internal spring pressure causes the drive balls to jam between the jaws of the outer race. In addition to increasing the torque capacity, it would be desirable to increase the life of the adjuster by reducing wear and tear on the race surfaces.

SUMMARY OF THE INVENTION

Briefly, there is provided in accordance with the present invention an improved ball type planetary friction drive mechanism wherein the relative contact pressure on the balls as compared to the pressure exerted on the balls by the prior art adjusters is reduced, and the relative contact area on the ball driving surface as compared to that of the prior art is increased thereby to enable increased torque without a consequent reduction in the life of the mechanism. In addition, the contact surfaces or tracks which respectively drive and are driven by the balls are substantially closer in length to one another than those of the prior art wherefor there is less slippage between the balls and these associated contact surfaces, and as a result, the accuracy of the system is not appreciably impaired as its torque capacity is increased. In accordance with still another feature of the invention the range of adjustment of an adjuster of given size is increased by utilizing curved or beveled ball driving surfaces as contrasted to the conical driving surfaces of the prior art.

GENERAL DESCRIPTION OF THE DRAWINGS

The present invention will be better understood by a reading of the followng detailed description taken in connection with the accompanying drawing wherein:

FIG. 1 is an elevational view of an adjuster embodying the present invention;

FIG. 2 is an enlarged, cross-sectional view of the adjuster of FIG. 1 taken along the line 2—2 thereof;

FIG. 3 is a cross-sectional view showing the drive assembly in a position different from that shown in FIG. 2;

FIG. 4 is a cross-sectional view of the adjuster taken along the line 4—4 in FIG. 2; and FIGS. 5A, 5B, 6A and 6B are explanatory views provided to facilitate an understanding of the principles of operation of the adjuster shown in FIGS. 1–4.

DETAILED DESCRIPTION OF THE INVENTION

Illustrated in FIGS. 1–4 is a preferred embodiment of the present invention in the form of an adjuster identified generally by the reference character 10. As best shown in FIGS. 1 and 2, the adjuster 10 includes a generally tubular housing member 12 having a mounting flange 13 and a generally tubular adjustment member 14 which is telescopically threaded over the lower and open end of said housing member 12. The housing member 12 and the adjustment member 14 are provided with suitable reference marks suitably graduated to visually indicate the drive ratio of the device. A first ball drive member 16, which is preferably the input member, is journaled by a ball bearing assembly 18 in an axial bore 20 in the end wall 21 of the adjustment member. A snap ring 22 removably fitted in an annular groove 23 in the wall of the bore 20 and a snap ring 24 removably fitted in an annular groove 25 in the ball drive member 16 together with respective annular shoulders 26 and 28 on the wall 21 and on the drive member 16 restrain the drive member 16 against axial movement relative to the adjustment member 14.

A second ball drive member 30 is slidably mounted on an axially extending stem portion 32 of the drive member 16 by means of a pin 34 which extends through a diametric hole 36 in the stem 32 into longitudinal slots 38 in the tubular hub portion of the drive member 30. A torque adjustment nut 40 is threaded onto the threaded end of the stem 32 and a coil spring 42 is held under compression between the nut 40 and the annular body portion 43 of the drive member 32. As is more fully explained hereinafter, the position of the nut 40 on the stem 32 is determinative of the torque capacity of the adjuster 10.

A driven member 44, which is preferably the output member of the adjuster 10, is provided with a tubular portion 46 functioning as a ball cage for a plurality of solid spheres or balls 48. The member 44 has a stem portion 50 which is journaled in an axial bore 52 in the end wall 54 of the housing member 12. A plurality of longitudinal slots 56 equal in number to the number of balls 48 are provided in the tubular portion 46 of the ball cage and extend to the distal end thereof. In the illustrated embodiment of the invention six such balls are used. Axial movement of the ball cage in the housing member is prevented by a snap ring 51 fitted in an annular groove 53 in the stem 50. The snap ring 51 also holds an annular dust cap 55 in place.

It may be seen from an inspection of FIG. 2 that the annular body portion 43 of the drive member 32 has an external diameter only slightly less than the internal diameter of the tubular portion 46 of the ball cage. Similarly, an annular body portion 58 on the drive member 16 has an external diameter which is slightly less than the internal diameter of the tubular cage portion 46. The body portions 43 and 58 have respective ball engaging annular ball driving surfaces 60 and 62 whcih are beveled, i.e., are provided with a radius as viewed in FIG. 2. As explained more fully hereinafter, these beveled surfaces, which together form the inner race or driving surface for the balls 48, enable a relatively wide range of torque adjustment in an adjuster of relatively small overall size.

A frusto-conical outer race 64 is provided on the internal surface of a thin-walled sleeve 66 mounted in a counterbore 68 in the housing member 12 against an annular shoulder 70. A pin 72 is pressfitted in a radial hole 74 in the housing member 12 adjacent to the shoulder 74 and extends into a slot 76 at the inner end of the sleeve 66 to lock the sleeve 66 against rotational movement relative to the housing member 12.

OPERATION

In use, the housing member 12 is fixedly mounted to any suitable structure such, for example, as to the housing of a meter whose output shaft is coupled to the drive member 16. The ball cage 44 may be coupled to any desired driven member such, for example, as the input shaft of a counter. As shown in FIG. 2 hexagonal sockets 76 and 78 are provided in the outer ends of the respective members 16 and 44 to facilitate the making of these connections. When connected in this manner, the member 16 constitutes the input to the planetary transmission of the adjuster and the ball cage member 44 constitutes the output. While this is the preferred manner of use of the adjuster 10, it will be recognized by those skilled in the art that the input and output can be reversed whereby the ball cage would be in input and the member 16 would be the output or the housing 12 can be rotated and one or the other of the members 16 or 44 may be fixed.

Considering the member 16 as the input, as the member 16 is rotated relative to the housing member 12, it causes the balls 48 to roll around the outer race surface 64 and thereby rotatably drive the ball cage 44 within the housing. The balls then rotate around respective central axis paralleling the longitudinal axis of the adjuster while they orbit that same axis. Slippage or skidding of the balls relative to both the inner and outer races is restrained by the friction between the races and the surfaces of the balls. This friction is, of course, directly related to the force exerted on the drive member 30 by the spring 42. Also, the drive ratio between the input member 16 and the output member 44 is related to the ratio of the radius of the balls to the distance between the axis of rotation of the balls and the inner race surface on which the balls are rolling. Referring to FIG. 5A, the latter distance is labeled D and the radius of the ball is labeled C.

In order to adjust the drive ratio of the adjuster, the adjustment member 14 is rotated relative to the housing to move the inner race surfaces up or down as viewed in FIG. 2 thereby to move the balls 48 up or down along the outer race surface 64. FIG. 3 shows the relative conditions of the inner and outer races when the balls are located near the open, lower end of the outer race. As the balls 48 are moved downwardly to effect a longer outer race, the inner race surfaces 60 to 62 move closer together whereby the distance D increases thereby decreasing the drive ratio of the adjuster. Inasmuch as the inner race surfaces are beveled, the change in drive ratio effected by a given longitudinal movement of the drive members 16 and 30 is greater than would occur if the inner race surfaces were frusto-conical. This fact is of particular importance where the overall size of the adjuster is limited and yet a maximum range of adjustment is desirable. Also, the use of beveled inner race surfaces lessens the tendency of the balls to become jammed between the inner race surfaces as the force exerted by the spring 42 is increased by tightening the nut 40 down onto the stem 32.

An important feature of the planetary transmission of the present invention is the fact that the contact force between the inner race and each of the balls 48 is distributed over the two inner race surfaces 60 and 62 thereby reducing the contact pressure and increasing the life of the adjuster. Also, the effective length of the inner race is substantially equal to the length of the outer race which also results in less wear on the race surfaces.

Another advantage of the adjuster 10 over the prior art is its simplicity of construction and ease of assembly. The ball cage 44 may be assembled to the housing by inserting the stem portion through the bore 52 and placing the snap ring 51 in the groove 53 over the dust cover 55. The drive members 17 and 30 should be preassembled and then partially inserted into the housing 12. With the housing held in an inverted position and the race surface 62 somewhat above the distal end of the ball cage, the balls 48 may be inserted into the open ends of the slots 60 between the inner race surfaces. The drive member 16 may then be pushed into the cage and carries the balls with it. The adjustment member can then be attached thereto to complete the assembly. A number of balls 48 exceeding three can be used provided that the outer race surface 64 has sufficient flexibility to assure a firm contact between it and all of the balls. If the surface 64 were completely rigid it is obvious that only three of the balls would effectively carry all of the load.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. An infinitely variable planetary transmission comprising
   a generally tubular housing member adapted to be fixedly mounted to a support
   a generally tubular adjustment member threadedly telescoped to said housing member for adjustable axial movement relative to said housing member, a first ball drive member journaled in an axial bore in said adjustment member and extending into said housing member, means restraining said first drive member against axial movement relative to said adjustment member, said first ball drive member having an external first annular race surface, a second ball drive member mounted to said first drive member for longitudinal movement relative thereto and having an external second annular race surface, means preventing relative angular movement between said first and second drive members, a ball cage journaled for rotation in an axial bore in said housing member, at least three balls carried at equally spaced apart positions in said cage and positioned in engagement with said annular race surfaces, spring means connected between said first and second drive members for exerting a force urging said annular race surfaces into engagment with said balls, and an outer race carried by said housing and having an internal frusto-conical annular race surface engaging said balls, whereby relative rotation between said adjustment member and said housing member axially moves said first and second drive members relative to said outer race to change the drive ratio between said first drive member and said ball cage.

2. An infinitely variable transmission according to claim 1, wherein
the annular ball engaging surfaces of said first and second ball drive members are beveled.

3. An infinitely variable transmission according to claim 2, comprising
torque adjustment means mounted to one of said drive members for adjusting the force of said spring urging said annular race surfaces into engagement with said balls,
wherein the maximum torque which may be transmitted by said transmission is adjustable.

4. An infinitely variable transmission according to claim 1, wherein said ball cage comprises
a member having a tubular extension in which said second drive member is disposed,
said tubular extension being provided with slots respectively receiving said balls,
said slots opening onto the distal end of said extension.

5. An infinitely variable transmission according to claim 1, wherein
more than three of said balls are provided, and
said outer race is a sleeve having a thin wall which flexes a sufficient amount so that all of said balls simultaneously engage said outer race.

6. An infinitely variable planetary transmission comprising a generally tubular housing member adapted to be fixedly mounted to a support, a generally tubular adjustment member threadedly telescoped to said housing member for adjustable axial movement relative to said housing member, a first ball drive member journaled in an axial bore in said adjustment member and extending into said housing member, means restraining said first drive member against axial movement relative to siad adjustment member, said first ball drive member having an external first annular race surface, a second ball drive member mounted to said first drive member for longitudinal movement relative thereto and having an external second annular race surface, the annular ball engaging surfaces of said first and second ball drive members being beveled, means preventing relative angular movement between said first and second drive member, a ball cage journaled for rotation in an axial bore in said housing member, a least three balls carried at equally spaced apart positions in said cage and positioned in engagement with said annular race surfaces, spring means connected between said first and second drive members for exerting a force urging said annular race surfaces into engagement with said balls, an outer race carried by said housing and having an internal frusto-conical annular race surface engaging said balls, and said first drive member has an external annular flange on which said first annular race surface is provided and an axial stem portion, said second drive member having a tubular body portion slidably disposed over said stem portion and an external annular flange on which said second annular race surface is provided, whereby relative rotation between said adjustment member and said housing member axially moves said first and second drive members relative to said outer race to change the drive ratio between said first drive number and said ball cage.

7. An infinitely variable transmission according to claim 6, wherein said ball cage comprises
a member having a tubular extension in which said second drive member is disposed,
said tubular extension being provided with slots respectively receiving said balls,
said slots opening onto the distal end of said extension 8. An infinitely variable transmission according to claim 6, wherein
more than three of said balls are provided, and
said outer race is a sleeve having a thin wall which flexes a sufficient amount so that all of said balls simultaneously engage said outer race.

* * * * *